United States Patent [19]
Cooper

[11] Patent Number: 6,118,456
[45] Date of Patent: Sep. 12, 2000

[54] METHOD AND APPARATUS CAPABLE OF PRIORITIZING AND STREAMING OBJECTS WITHIN A 3-D VIRTUAL ENVIRONMENT

[75] Inventor: David G. Cooper, Los Gatos, Calif.

[73] Assignee: Adaptive Media Technologies, Sunnyvale, Calif.

[21] Appl. No.: 09/054,338

[22] Filed: Apr. 2, 1998

[51] Int. Cl.[7] .................................................. G06F 15/00
[52] U.S. Cl. .............................................................. 345/433
[58] Field of Search .................................... 345/433, 419, 345/421, 422, 425

[56] References Cited

U.S. PATENT DOCUMENTS 5,659,691  8/1997  Durward et al. .......................... 345/419
5,675,721  10/1997  Freedman et al. ....................... 345/419

OTHER PUBLICATIONS

Arikawa, M. et al., "Dynamic LoD for QoS Management in the Next Generation VRML," *Proceedings of the Intl. Conf. on Multimedia Computing and Systems,* Jun. 17, 1996.

Funkhouser, T.A. and Sequin, C.H., "Adaptive Display algorithm for Interactive Frame Rates during Visualization of Complex Virtual Environments," Computer Graphics Proceedings, Annual Conf. Series 1993, pp. 247–254.

Airey, J.M.; Rohlf, J.H.; Brooks, F.P. Jr.; "Towards Image Realism with Interactive Update Rates in Complex Virtual Building Environments," Computer Graphics, ACM SIGGRAPH Special Issue on 1990 Symposium on Interactive 3D Graphics, vol. 24, No. 2, Mar. 1990, pp. 41–50.

Blake, E.H.; "A Metric for Computing Adaptive Detail in Animated Scenes using Object-oriented Programming," *Eurographics '87* Elsevier Science Publishers B.V., Proc. of European Computer Graphics Conf. and Exhibition, Amsterdam, Aug. 24–28, 1987, pp. 295–307.

Brooks, F.P. Jr.; "Walkthrough—A Dynamic Graphics System for Simulating Virtual Buildings," Abstracts from the 1986 Workshop on Interactive 3d Graphics, Computer Graphics, vol. 21, No. 1, Jan. 1987, p. 3.

Funkhouser, T.A.; Séquin, C.H., Teller, S.J.; "Management of Large Amounts of Data in Interactive Building Walkthroughs," ACM SIGGRAPH Special issue on 1992 Symposium on Interactive 3D Graphics, 11–20.

*Primary Examiner*—Phu K. Nguyen
*Attorney, Agent, or Firm*—Pillsbury Madison & Sutro LLP

[57] ABSTRACT

A method of assessing objects in a 3D graphical scene provides discovery of the most important objects in that scene from the viewer's perspective at any instant in time. These objects are then queued in priority order and requests for each object's data sent to the server at a rate determined by the available network bandwidth. The importance of each object is recalculated per scene update and new requests are sent out based on these values. Only data requests that can be responded to within the next update cycle are sent, while most request messages are retained. This allows for immediate response to a changing view position, and reduces visual latency, defined as the time that lapses until an object having a data deficit gets that data. Latency is reduced for important objects at the cost of lesser objects. Because important objects are those which contribute most to the visual scene, the overall richness of the scene appears to grow faster than the number of objects received.

18 Claims, 5 Drawing Sheets

METHOD AND APPARATUS CAPABLE OF PRIORITIZING AND STREAMING OBJECTS WITHIN A 3-D VIRTUAL ENVIRONMENT

BACKGROUND OF THE INVENTION

1. Field of the Invention

The present invention relates to computer graphics, and more particularly, to a method and apparatus that adaptively prioritizes objects in a 3-D virtual environment for low-latency streaming.

2. Description of the Related Art

Interactive computer graphics systems produce realistic-looking, three-dimensional models and are useful for applications such as architectural and mechanical CAD, flight simulation, and virtual reality. Such graphics systems typically include a computer workstation that displays images of a three-dimensional model on a video screen as seen from a simulated observer's viewpoint that can be interactively controlled by a user. It is generally desired that such graphics systems maintain an interactive frame rate that is substantially constant (e.g., ten frames per second).

Complex three-dimensional models consist of hundreds or thousands of objects, for example, a model of a house with dozens of rooms, each containing different furnishings. As the simulated observer's interactive viewpoint changes (e.g. moving from room to room and moving closer to certain furnishings), objects can enter or leave the simulated field of view, or can be occluded from view by other objects. Objects are typically modeled offline by a modeling process, and consist of tesselated polygonal approximations or meshes. For realistic representation, modeled objects can contain thousands of polygons, each of which must be rendered independently on a display. Accordingly, the realistic representation of all objects in a scene at desired constant frame rates, and with changing interactive viewpoint, is beyond the capabilities of conventional interactive computer graphics systems.

Techniques have been developed to reduce the processing required to render a virtual environment within the desired frame rates. For example, it is not necessary to render objects that are not visible to a hypothetical viewer in the environment, so such objects can be culled from the scene to be represented. This reduces processing requirements without degrading accuracy. However, for complex virtual environments, the processing savings from culling non-visible objects are not sufficient to maintain the desired interactive frame rates.

For further efficiency, detail elision techniques establish a heirarchy of objects within a field of view, each with a number of levels of detail (corresponding to the number of polygons that have to be rendered, for example). Some objects are rendered at higher levels of detail than other objects, thus further reducing processing requirements. Heuristics are employed to determine which object should be rendered at what level of detail, for example, rendering apparently closer or larger objects at higher levels of detail than objects that are far away or which occupy less screen area. Such heuristics are designed to reduce the number of polygons associated with the object that need to be rendered without substantially reducing image quality. The heuristics can be static, that is, having a constant set of thresholds from frame to frame, or they can be adaptive, where the thresholds are adjusted dynamically in accordance with a target parameter such as frame rate.

In a paper entitled "Adaptive Display Algorithm for Interactive Frame Rates During Visualization of Complex Virtual Environments," Computer Graphics Proceedings (SIGGRAPH '93), pp. 247–254 (1993), Funkhouser and Sequin teach a predictive algorithm for prioritizing objects in a scene using adaptive heuristics so as to produce the "best" image possible within a target frame rate time. For each frame, the available levels of detail of each potentially visible object in a scene are tagged with a benefit (e.g. contribution to overall image quality) and a cost (e.g. contribution to overall rendering time). The total cost of rendering all objects can not exceed the target frame time, and the chosen level of detail for each object is that which results in the highest benefit/cost ratio. This algorithm purportedly achieves near uniform frame times for all observer viewpoints while optimizing the qualitative human visual perception of the scene.

However, many challenges remain that are not addressed by conventional techniques.

Like many conventional assessment algorithms, Funkhouser requires all object data and level of detail information to be available to it in order to fully assess the benefits gained by rendering certain objects at levels of detail greater than other objects. In a server-client configuration, where object data is stored on the server and where the assessment algorithm executes on a client, this means that all object data and level of detail information must be previously transmitted from the server to the client before assessment processing begins. For complex graphical scenes, with large numbers of objects, this requires substantial transmissions of data and requests between server and client. Moreover, since the algorithm operates on all data associated with all of the objects, substantial processing power is required.

Conventional assessment algorithms also fail to account for many factors that affect visual richness of a scene. For example, visual latency is an important factor that is not addressed. Visual latency is a measure of the time between when an object first becomes visible in a scene to when it is rendered in full detail. Simply put, the visual latency of important objects in a scene affects the overall visual richness of the scene more than the visual latency of less important objects. Put another way, reducing latency for important objects causes the overall visual richness of the scene to appear to improve quicker than just elevating their level of detail over less important objects.

The importance of latency is further pronounced in a network environment, for example, where object data must be transmitted from a server to a client, and where objects move in and out of scenes and become less or more important within scenes in response to changing viewpoints within the virtual environment. Since the channel between the server and client typically has a limited bandwidth, simply prioritizing objects within a scene based on the time required to render each object, as performed by Funkhouser, does not consider the costs associated with requesting and transmitting object data between the server and client. In particular, if the available bandwidth is consumed by requests and transmissions of data for less important objects at the expense data for more important objects, the visual richness of the scene will suffer even if the less important objects are rendered at lesser detail. Moreover, requests and transmissions of object data should keep in step with the changing viewpoint, as different objects become more important to the scene, so that the latency of important objects is kept to a minimum.

Another factor that is not accounted for by conventional assessment algorithms is viewer turn rate. Some algorithms attach more importance to objects appearing at the center of the screen than those appearing outside the center. Meanwhile, however, when a simulated observer's viewpoint is turning within the scene, the user who is commanding such movement will tend to be more interested in objects that are in the direction of the turn. Such an interest will be further in proportion to the rate at which the viewpoint is turning. Accordingly, higher priority should be given to those objects in the direction of the turn in proportion to the rate of the turn.

Therefore, there remains a need for an implementation for prioritizing objects within 3D virtual environments and for managing the streaming of the objects in response to changing viewpoints that effectively addresses these challenges. The present invention fulfills this need.

SUMMARY OF THE INVENTION

An object of the present invention is to provide a method and apparatus that effectively manages the display of a complex 3-D graphical scene.

Another object of the present invention is to provide a method and apparatus for managing the display of a complex 3-D graphical scene that is capable of working with a large number of objects.

Another object of the present invention is to provide a method and apparatus for managing the display of a complex 3-D graphical scene that is capable of reducing the visual latency of the display in response to a changing viewpoint.

Another object of the present invention is to provide a method and apparatus for managing the display of a complex 3-D graphical scene that effectively utilizes the total bandwidth of the server/client stream.

Another object of the present invention is to provide a method and apparatus for managing the display of a complex 3-D graphical scene that is capable of fairly assessing visual importance of partially transmitted objects as well as fully transmitted objects.

Another object of the present invention is to provide a method and apparatus for managing the display of a complex 3-D graphical scene that requires only bounding box information to assess an object's visual importance.

These and other objects and advantages are accomplished by the present invention by providing, among other features, an object assessment function and a streaming function. The object assessment function determines the visual importance of objects in a 3D graphical scene while taking into consideration the instantaneous hypothetical viewer's viewpoint of the scene, and determines the order in which those objects should receive data. The streaming function requests data for those objects from the server in a manner that maximizes the available bandwidth for requesting and transmitting such data. Reduced visual latency and increased richness of the scene to the perception of the viewer are thereby achieved.

BRIEF DESCRIPTION OF THE DRAWINGS

These and other objects and advantages of the present invention will become apparent to those skilled in the art after considering the following detailed specification, together with the accompanying drawings wherein.

DETAILED DESCRIPTION OF THE PREFERRED EMBODIMENTS

Figure 1:
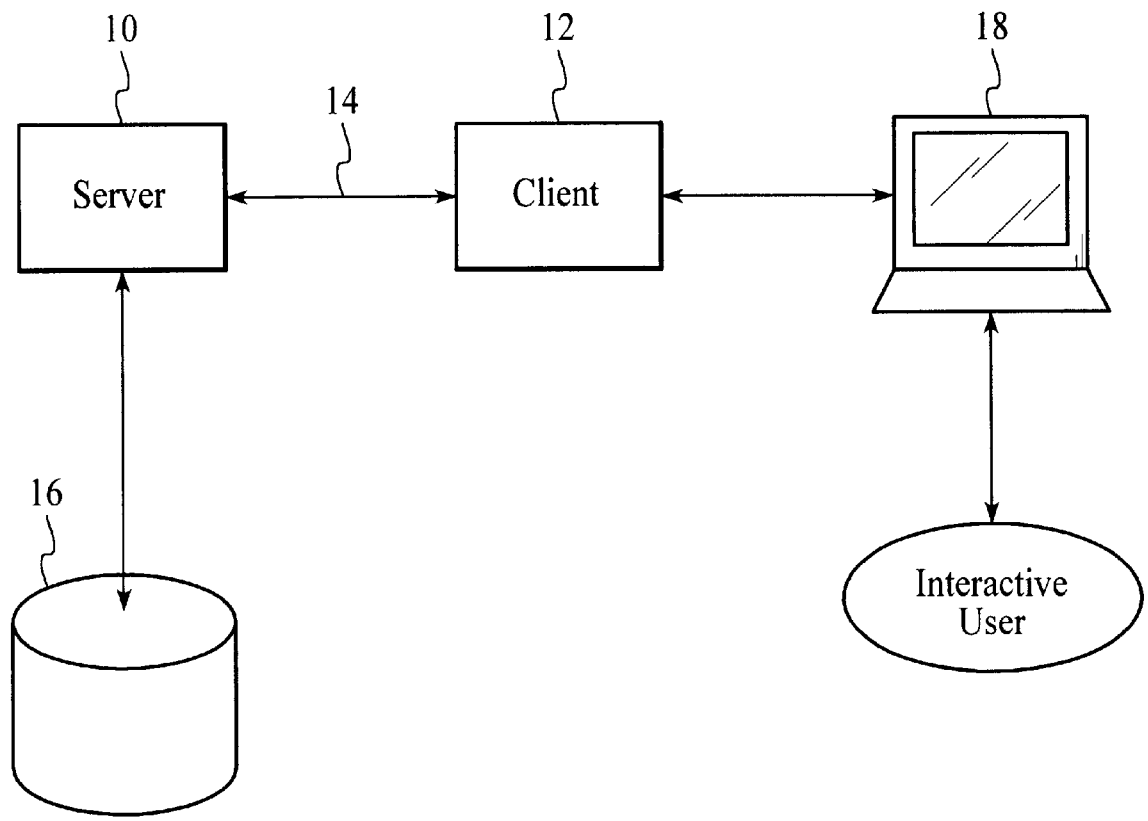
FIG. 1 is a block diagram illustrating an interactive 3-D graphical system according to the present invention.

As shown in FIG. 1, an interactive 3-D graphical system according to the invention includes a server 10 that communicates with a client 12 via a data pipe 14. The server side includes a data storage device 16 that stores three-dimensional graphical representations of a modeled scene. The client side includes an interactive 3-D graphical display system 18 that receives commands from an interactive user and displays three-dimensional graphical images in response to user commands and image data received from server 10 via client 12.

In one example of the invention, server 10 is a host process executing on a file server computer, data storage device 16 is a hard disk drive, data pipe 14 is a local or wide area network, client 12 is a client process executing on a computer workstation and communicates with the host process via the network using streams protocols, and 3-D graphical display system 18 is a video display system with input/output devices such as a keyboard and a mouse. It should be apparent that the computer workstation associated with the client process can include the video display system that supports 3-D graphical display system 18. It should be further apparent to those skilled in the art that each of the elements described above can be embodied in various combinations of other hardware and software elements that are different from this example.

Figure 2:
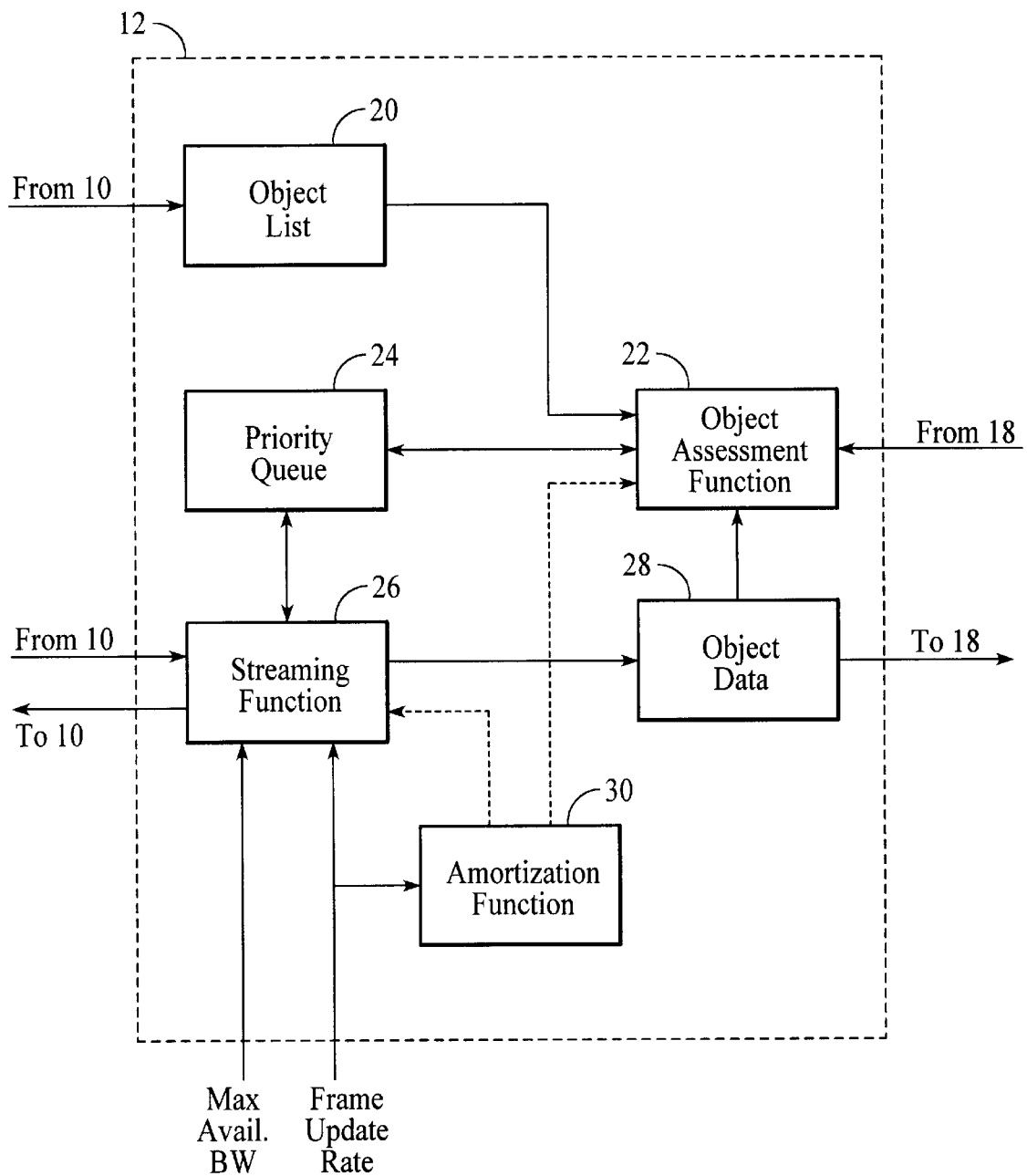
FIG. 2 is a functional block diagram illustrating a client in an interactive 3-D graphical system according to the present invention.

FIG. 2 further illustrates a client 12 in accordance with the invention. It includes an object list 20, an object assessment function 22, a priority queue 24, a streaming function 26, an object data table 28, and an amortization function 30.

Object list 20 contains a list of objects within a computer generated three-dimensional environment that are stored in representative form in data storage device 16. The contents of object list 20 are initialized by data received from server 10, which data includes the bounding box geometry for each object (as described in more detail below), the position of the object within the 3-D virtual environment, and the amount of data associated with the object that is needed to fully render the object.

Object assessment function 22 maintains a list of visible objects in priority queue 24 in accordance with an instantaneous viewpoint of a hypothetical viewer within the three-dimensional environment. The instantaneous viewpoint is updated in accordance with user commands as processed by interactive 3-D graphical display system 18. Object assessment function 22 determines a priority value for each visible object among the objects in object list 20, in accordance with an algorithm that will be described in more detail below, and orders the list of objects in priority queue 24 correspondingly. Object assessment function 22 also monitors the contents of object data table 28 to determine which objects need more data to be rendered accurately.

Streaming function 26 manages the request and receipt of object data from server 10 via data pipe 14. Data pipe 14 has a maximum available bandwidth, which can be received as a parameter by streaming function 26. In accordance with an algorithm that will be described in more detail below, streaming function 26 determines the amount of object data that can be received during each update cycle (corresponding to the frame update rate, which can also be specified by a parameter input by streaming function 26), given the maximum available bandwidth of the data pipe, and fills the available bandwidth by making requests of object data in accordance with the contents of priority queue 24. The received object data is stored in object data table 28, where it is made available to a rendering program in interactive 3-D graphical display system 18.

Amortization function 30 assigns to object assessment function 22 and streaming function 26 respective amounts of time within the update cycle in which to operate. When the assigned time period is exceeded, processing related to the respective function is not permitted to continue and control is given to the other function. On the next frame update cycle, processing for each function continues from the previous termination point. Accordingly, object assessment function 22 and streaming function 26 need not process a predetermined number of objects each update cycle. Rather, amortization function 26 insures that the processing times for each function do not exceed the amount of time elapsed during an update cycle. Assuming frame coherence, (i.e., a high degree of similarity between scenes in successive frames) any error introduced by cutting off processing before all objects are updated each frame should be minimal and quickly remedied.

Figure 3A:
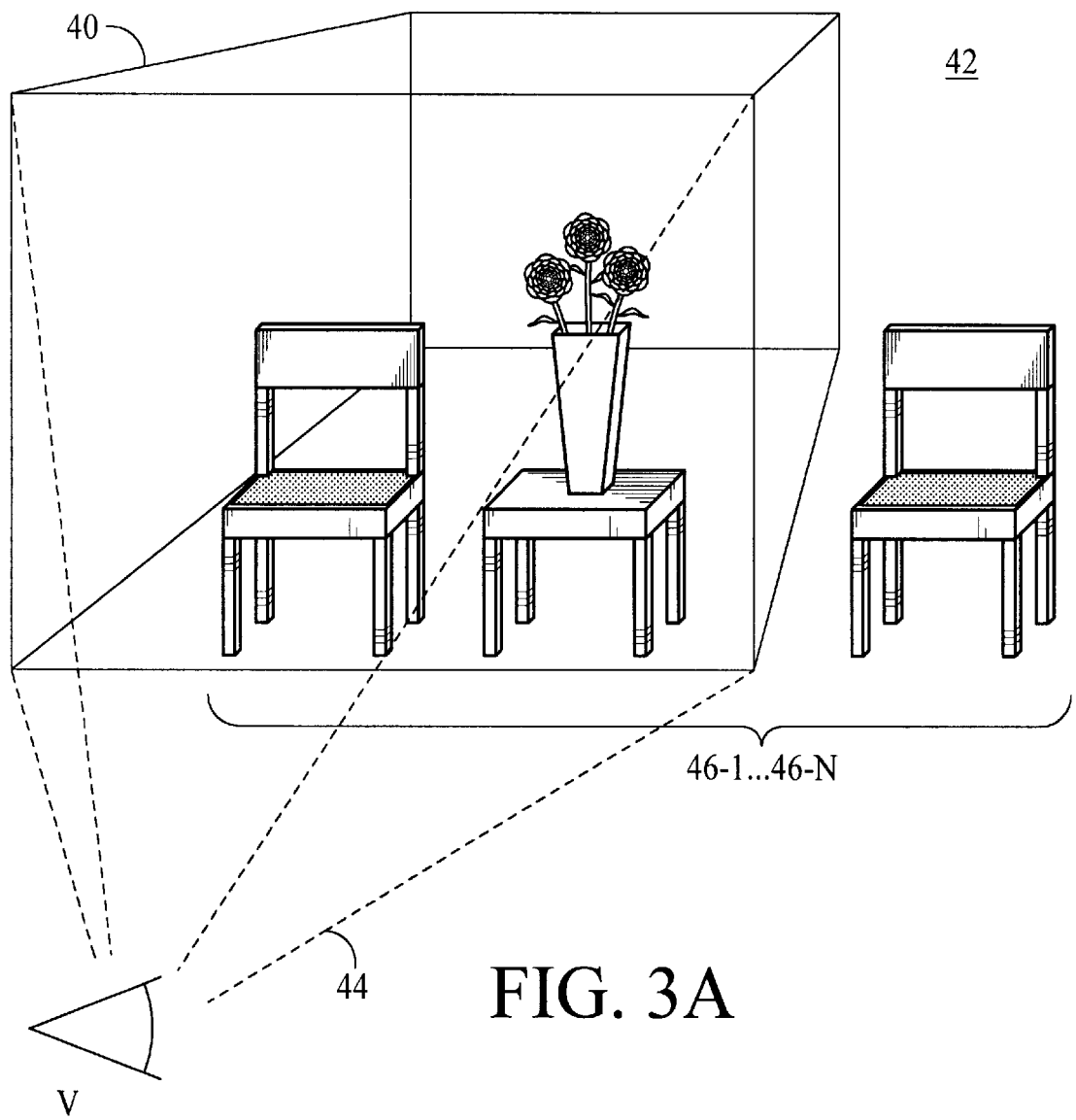
FIGS. 3A and 3B illustrate scenes and objects in a 3-D virtual environment that are captured by an instantaneous hypothetical viewpoint according to the present invention.

As shown in FIG. 3A, a three-dimensional scene 40 according to the invention is a partial view of a computer-generated 3-D environment 42 that is capable of being displayed on a computer display such as that included in interactive 3-D graphical display system 18. Scene 40 continuously changes based on the movement of hypothetical viewer V through the environment, as commanded by the interactive user through interactive 3-D graphical display system 18. The hypothetical viewer's instantaneous position and perspective within the environment that captures scene 40 is referred to as viewpoint 44.

Environment 42 includes a number of objects 46-1 . . . 46-N. Each object is actually a mesh comprising a collection of polygons that result from an offline tesselation of a modeled physical object, the techniques for performing such offline tesselation and mesh generation being well known in the art. The collection of polygons for each object is stored on data storage device 16. It should be noted that at any given time, certain ones of objects 46-1 . . . 46-N may be within scene 40 visible through viewpoint 42, while certain others may be outside the scene.

Figure 3B:
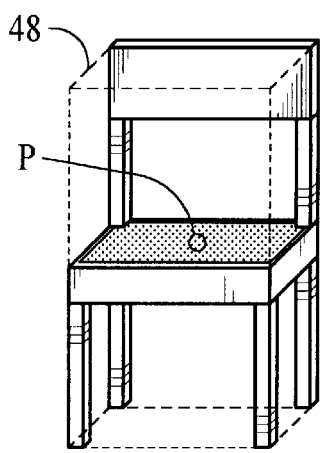

As shown in FIG. 3B, each object has a position P within environment 42 with respect to a Cartesian coordinate system. Further associated with each object is an axially aligned bounding box 48 that describes the object's position and volume. This box is sized so as to exactly contain all of the object's geometry with respect to each axis. The exact center of the bounding box corresponds to the position P of the object with which the bounding box is associated. Bounding box information is stored on the client side in object list 12.

Scene 40 is rendered on a computer display such as on interactive 3-D graphic display device 18 by rendering each object, one at a time. Rendering of scene 40 is repeated every frame update cycle. A frame is a single update of the system. The frame update cycle is the number of times per second the system updates. To render the scene each frame, display device 18 accesses data from object data table 28 for each object within the scene. To be accurately rendered, the object's entire collection of polygons (i.e., object data) must have been transmitted from server 10 to client 12. When an object needs more data than it currently has stored in object data table 28 to be rendered accurately, that object has a data deficit, and additional data must be requested from, and transmitted by, server 10.

Requests for object data by client 12 (i.e. back channel data), and transmissions of object data from server 10 to client 12 (i.e. forward channel data), both consume bandwidth. The bandwidth of data pipe 14 refers to the total amount of data in bits per second that can be communicated between client 12 and server 10.

To utilize the available bandwidth efficiently, therefore, the present invention includes object assessment function 22 and streaming function 26. As will be explained in more detail below, for all visible objects in a scene that have a data deficit, object assessment function 22 determines an importance value associated therewith. Streaming function 26 then sends requests to server 10 for data for those objects starting with the most important objects, as queued in priority queue 24 by object assessment function 22, and progressing to the least important as resources permit. The amount of data requested is carefully monitored and transmissions of requests stop when it has been determined that the data requested exceeds the amount of data that can be returned before the next update cycle.

Figure 4:
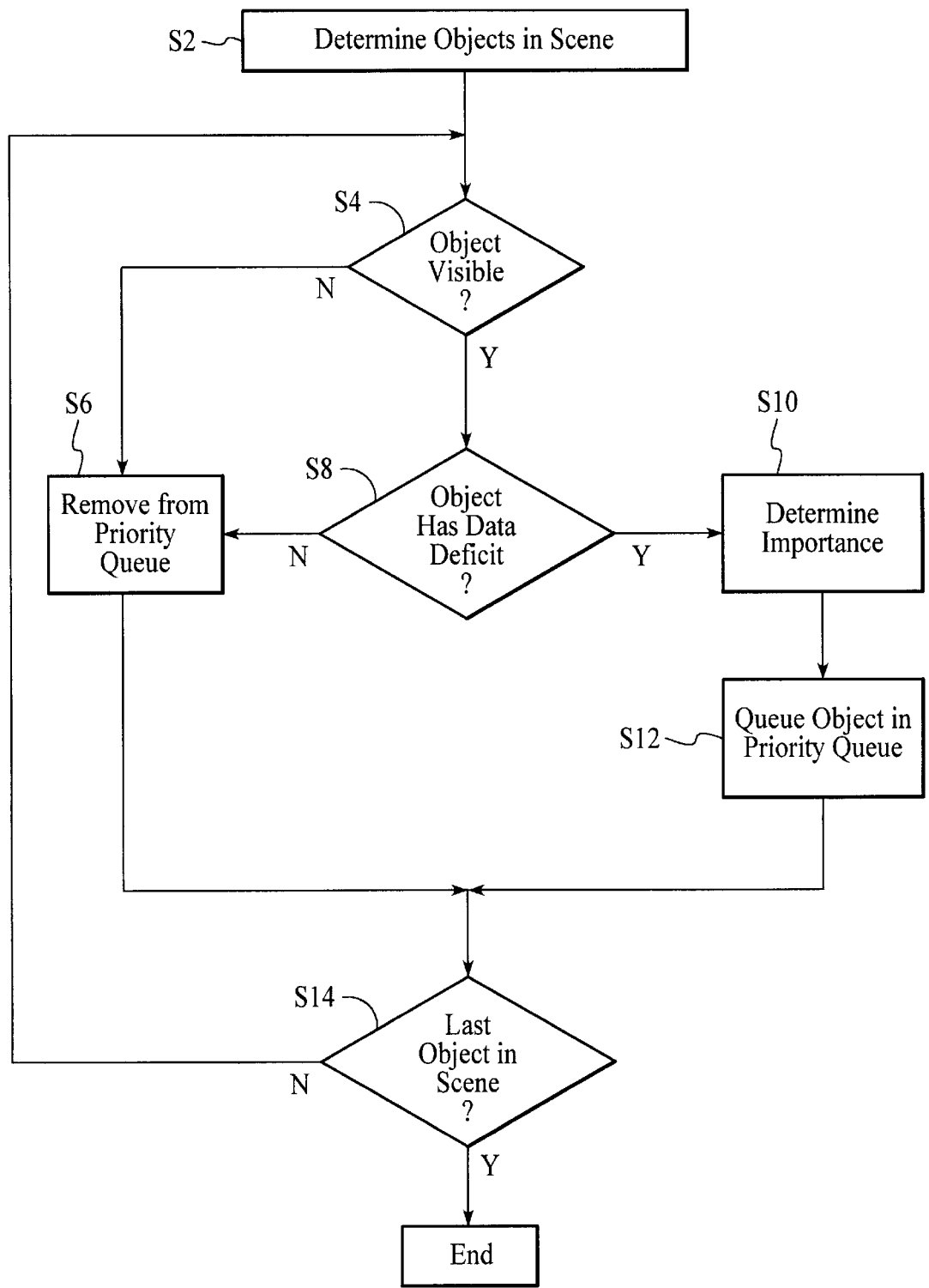
FIG. 4 is a flowchart illustrating processing performed by an object assessment function according to the present invention.

FIG. 4 illustrates processing performed by object assessment function 22.

When the scene updates, in response to a user-commanded change in viewpoint for example, all objects currently queued for receiving data are reprioritized with the goal that the most important objects in the scene for the current viewpoint are most accurately rendered. First, in step S2, object assessment function 22 determines what objects are within the current scene that is captured with the viewpoint for this update cycle. This can be performed, for example, by comparing the current viewpoint with the position and geometry of each object's bounding box stored in object list 20.

Next, in step S4, object assessment function 22 determines whether the object within scene 40 that is currently being analyzed is visible. Operating on only visible objects reduces the number of objects that need to be considered at any one time and makes the algorithm more amenable to large data sets. If a visible object has been previously queued as needing data, but then falls outside the viewpoint of the hypothetical viewer or otherwise becomes not visible, it is removed from priority queue 24 (step S6). Object visibility can be determined using techniques that are known in the art, including for example spatial culling, view frutsrum culling and occlusion culling.

If it is determined in step S4 that the object is visible, object assessment function 22 then determines whether the data has a data deficit. That is, it is determined in step S8 whether all of the data needed to render the object accurately is stored in object data table 28. For example, if the amount of data in object data table 28 equals the amount of data required to fully render the object, as listed in object list 22 for the object, that object can be rendered accurately. If so, no data for the object needs to be requested, so the object is removed from priority queue 24 if it was previously queued therein (step S6).

Otherwise, if the object is visible and has a data deficit, processing advances to step S10, where object assessment function 22 determines the relative priority to be assigned to the object.

Object priority is determined by calculating an Importance value for each object in the scene based on a set of common evaluation factors. Importance is thus a measure of an object's contribution to the visual richness of the overall scene. It takes into account the characteristics of the object with regard to the current viewing position. As the hypothetical viewer's viewpoint changes, an object's importance may change. Prioritizing requests for data so as to more completely render those objects that contribute most to the scene, and updating those priorities in accordance with the changing viewpoint, results in a visual perception that the richness of the scene is improving rapidly in response to such changes in viewpoint.

It should be noted that objects within the scene can have different data deficits. That is, some objects may have sufficient data already transmitted to the client side so as to be rendered with high resolution, while others may have only their primitive representations already transmitted. In order to process all objects in the scene fairly and consistently, the lowest common denominator of the data states, the primitive representation, of all objects should be used. In this example of the invention, object assessment function 22 therefore utilizes only the geometry of the bounding box associated with each object to make priority assessments. This makes it possible to compare objects that may have no data against objects that have received several data updates. Moreover, because calculations using the bounding box representation are typically less intensive, advantages in processing speeds are obtained.

Object assessment function 22 determines the Importance of each visible object by calculating and summing together a series of n Value/Weight pairs for the object. These pairs consist of a component that is instantaneously calculated for the object (the Value) and a corresponding scaling factor (the Weight) that determines how important the corresponding Value is to the overall Importance. Accordingly, for each object O, $$\text{Importance}(O) = \Sigma(\text{Value}(n,O) * \text{Weight}(n))$$

Preferably, the calculation of all Values are scaled so that each calculated Value falls within a range of 0 to 1000, and all Weights are assigned so that they sum to a value of 1000. This results in a calculated Importance that is always between 0 to 1,000,000, thus allowing simple and fast comparison between objects in a scene. The number 1,000,000 is used to provide greater accuracy with integer operations. Integer operations are preferably used for fastest execution speed.

In one example of the invention, the n Values that are calculated, weighted, and summed together for each object are Distance, Screen Area, Message, Focal Point, Movement, and Frames Ignored. Each of these will be explained in more detail below.

The Distance Value represents the straight line distance in Cartesian space between the instantaneous position of the hypothetical viewer V ($V_x$, $V_y$, $V_z$) and the object O ($O_x$, $O_y$, $O_z$). Accordingly:

$$\text{Unscaled Distance} = \text{sqrt}((V_x-O_x)^2 + (V_y-O_y)^2 + (V_z-O_z)^2)$$

The Unscaled Distance is then scaled with respect to the maximum scene dimensions Max Diag to be between 0 and 1000.

if (Unscaled Distance>Max Diag) then
  Distance=0;
else
  Distance=1000−((Unscaled Distance/Max Diag)*1000)

The Screen Area Value indicates the area occupied by the object within the entire scene, and thus its visual impact on the scene. There are two steps to calculating this Value. First, the number of pixels that the bounding box of the object occupies is calculated, then this number is converted to a percentage of the total screen area that the object occupies.

In the first step, the coordinates of the corners of the bounding box are multiplied through the projection matrix for the scene and the resulting screen space numbers give the pixel coordinates of these points on the screen. The largest and smallest X and Y coordinates are selected to determine the overall screen area.

$$\text{Pixel Area} = (X_{max}-X_{min}) * (Y_{max}-Y_{min})$$

In the second step, the resulting value is scaled relative to the total screen area, giving a value of 1000 for a bounding box which occupies the full screen and a value of 0 for an object which is smaller than one pixel.

The following integer calculation is used $$\text{Screen Area} = (\text{Pixel Area} * 1000)/\text{Total Screen Pixel Area}$$

The Focal Point Value considers the area of the screen where the viewer is most likely to be looking and assigns higher importance to objects in this area than objects outside this area.

The Focal Point is nominally the center of the screen and is modified by a factor related to the amount of the instantaneous turn rate and the maximum turn rate of the viewer. The Focal Point Value is calculated to fit the following scale 0=furthest point from the focal point 1000=exactly on the focal point The focal point is offset from the center of the screen by the following algorithm Offset=(Screen Size/2)*(turn rate/MAX_RATE)

Pixel position of the focal point=(Center of the screen)+Offset

Turn rate is a number that grows positive for left turns and negative for right turns and increases to a maximum value determined by MAX_RATE. This maximum value corresponds to the maximum angular change in heading the viewer can achieve in one scene update. This maximum can be set as a parameter for a particular application. For example, if the application uses a car as a hypothetical viewer moving through a virtual environment rather than a person walking, the maximum turn rate will be different. The maximum right and left turns are denoted by a polarity of the MAX_RATE parameter, that is:

Max right turn (=−MAX_RATE)<0<Max left turn (=MAX_RATE)

Turn rate is calculated by comparing the viewer's heading (horizontal rotation) in the current frame to the viewer's heading in the previous frame. The difference between the two is the instantaneous turn rate. To account for frame rate variance, the instantaneous heading difference is scaled by the actual time elapsed between the two frames using the following equation:

Turn rate=(heading−previous heading)/(frame update time)

The turn rate is then used to offset the focal point from the center of the screen as shown above. The effect of this calculation is to push the most important screen area progressively to the right when turning to the right and towards the left when turning left, in proportion to the rate of the turning. This mimics the natural tendency of a viewer to look in the direction of movement. When the viewer is moving at MAX_RATE then the focal point will be at the very edge of the screen, in the direction of movement.

The pixel coordinates of each object can be calculated as above with regard to the Screen Area Value. Object assessment function 22 then compares the screen position of the Focal Point to the screen position of the object and scales the comparison result in accordance with the formula given above, that is, 0 for an object that is the maximum screen distance from the Focal Point, and 1000 for an object whose coordinates are the same as the Focal Point.

The Movement Value is used to record how individual objects are moving in screen space relative to the viewpoint. Objects which are moving least are those toward which the viewer is moving, those that are moving the most are those that the viewer is moving away from. If the viewer is moving toward an object, then its importance should increase, but if the viewer is moving away from an object, then its importance should decrease. This is accounted for by determining the difference between the object's position in the preceding frame update cycle and the object's current position, that is:

Movement=center of object's pixel area−center of object's pixel area in previous frame Center of object's pixel area=$X_{min}+(X_{max}-X_{min})/2$ The Movement Value is then scaled to fit the following range:

1000=No movement since the last frame

0=Movement of over ½ the screen since the last frame

The final calculation is

Movement Value=1000−((Movement*1000)/(screen $X_{max}$−screen $X_{min}$))

The Message Value is a factor that is used to elevate the importance of some types of objects over others. It is application specific and can be used to incorporate a subjective value for the visible objects in a scene. The application specifies what the Message Value should be for each object, and a default value of 0 is assumed when the application does not specify anything.

Message Value=(application specific value between 0 & 1000)

The Frames Ignored Value attributes increased importance to an object the longer it remains in the scene without having received any data. This insures that data will be requested from the server for even the least important objects in the scene. For each frame update cycle that an object is present in a scene and its data is not requested then this value is increased by 1.

Frames Ignored=Number of Frames in the priority queue+1

The Weights used for each Value are empirically discovered values. In one example of the invention, these are assigned as follows:

Distance=400
Focal Point=300
Movement=100
Screen Area=75
Frames Ignored=75
Message=50

These values may be changed as desired to emphasize the factor deemed appropriate for certain types of environments.

After determining the importance of the object, processing advances to step S12, where the object is queued in priority queue 24. This queue is an ordered list of objects with the most important objects at one end and least important objects at the other. Insertion into the queue is a time intensive task and can become prohibitive if the number of objects becomes large or an object needs to get reinserted each time its value changes. Both conditions are probable so object assessment function 22 attempts to minimize the potential impact of such tasks by the following. When an object first has a data deficit then it is inserted into the priority queue 24, incurring the full insertion cost. Thereafter if the value of the object changes then it is only moved relative to its current position in the list. Given the assumption that no object will change greatly from update to update (i.e. frame coherence), then this amortizes the cost of maintaining a priority list and makes it possible for very large collections of continuously changing objects to be processed within a small time frame.

Insertion requires placing the new object into the correct sorted position within the queue. To do this, potentially all existing queue entries have to be compared against the new value until the sort test passes. The worst case for this would be that every entry would have to checked before the correct point is found. There are various techniques to optimize insertion. In this example of the invention, the technique employed is that provided by the Standard Template Library (STL), called a "map". This technique guarantees that the insertion time is of order (O)*NlogN, where N=the number of entries in the queue and O is the time to do a comparision test.

After an element is in sorted order, changes in its priority between successive frames will be minimal due to frame coherence. That is, there is a reasonable chance its new position in the queue will be very close to its current position. If STL inserts from the object's previous position in the queue it is very possible that the insertion time will be close to the constant time. This means that the time to move an element is no longer dependent on the number of elements in the queue. Therefore, the time required to change an object's position in the queue will be much less than the insertion time for a large number of objects in the queue.

After the prioritized visible object having a data deficit is queued in step S12, or after a non-visible or visible deficit-less object is removed from the queue in step S6, processing advances to step S14. Here it is determined whether the object just processed is the last object in the scene. If not, processing returns to step S4; otherwise, processing ends.

Figure 5:
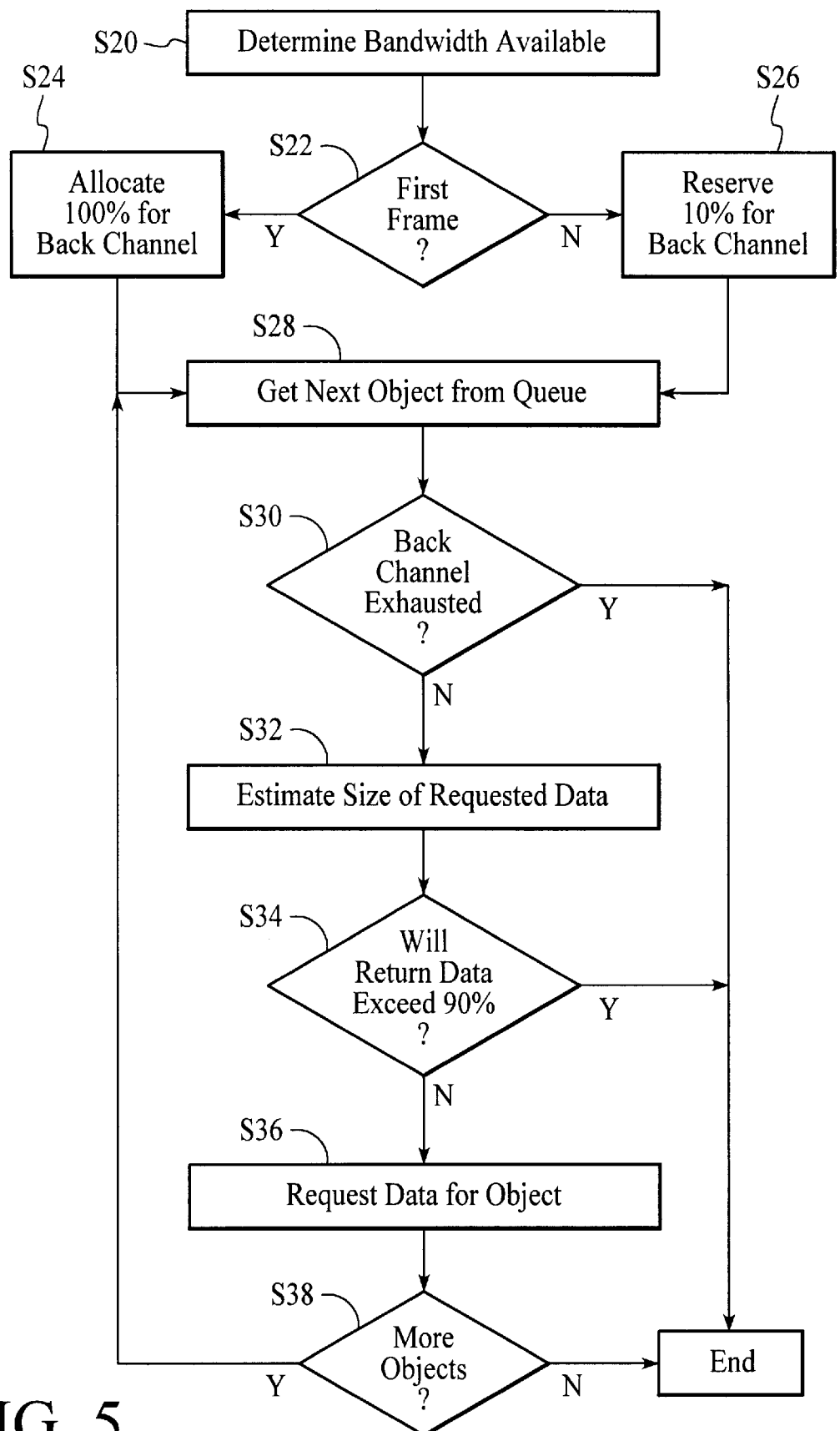
FIG. 5 is a flowchart illustrating processing performed by a streaming function according to the present invention.

FIG. 5 illustrates processing performed by streaming function 26.

In the first step S20, streaming function 26 determines the amount of available bandwidth in bits per update cycle. This can be calculated as the product of the maximum available bandwidth (in bits/second) and the frame update rate (in seconds), both of which can be received as input parameters by streaming function 26. It should be noted that for a given network bandwidth, the more frequent the update rate, the less bandwidth will be available per update cycle.

Streaming function 26 reserves a portion of the available bandwidth each update cycle for the purpose of sending object data requests and control messages to the server. The remaining bandwidth is free for the server to send object data back. The portion of the bandwidth reserved for the streaming function is called the Back Channel.

Accordingly, when processing advances to step S22, streaming function 26 determines whether this is the first frame for which a scene from the desired environment is being viewed. If so, all of the available bandwidth can be used for sending object data request messages on the Back Channel (step S24). If this is not the first frame, 10% of the available bandwidth is reserved as a minimum for the Back Channel (step S26). It should be noted that 10% is given as an example of the default minimum value; the actual amount reserved can be chosen according to the particular application.

Streaming function 26 then proceeds to work through the sorted list of objects in priority queue 24 and to fill up the available bandwidth for requests to the server for the data that they require. It attempts to make maximum use of the available bandwidth but will only send as many data requests as can be expected to be filled by the server by the time of the next frame update, considering the amount reserved for the Back Channel. By assuring that data for requested objects will be returned within the next update cycle, the latency for any object requested is kept to a single frame. Moreover, in the next update cycle, since those objects will have no data deficit, they will be dropped from the priority queue, and objects remaining in the scene whose data was not requested will be re-prioritized by object assessment function 22. This further guarantees that at any time the most important visible objects in any update cycle are at most one frame delayed from receiving data. Assuming frame coherence, then the change in object importance from any one frame to another will not be large, so the data received should have a high visual impact.

In accordance with the above, in step S28, streaming function 26 gets the next object from priority queue 24, that is, the object with the next highest priority. Streaming function 26 then determines whether the request for data for this object will exceed the bandwidth reserved for the Back Channel (step S30) by, for example, incrementing a counter by a predetermined amount and comparing it to the bandwidth reserved for the Back Channel. If the Back Channel's allocated bandwidth will be exceeded by requesting data for this object, processing ends.

Otherwise, processing advances to step S32 where the bandwidth that will be consumed in the next frame by sending the amount of data needed for the object from the server to the client is estimated. This estimation can be performed by maintaining a table that matches data type requests to the size of data that will be returned for that request (in number of bits, for example). From such a table, for every object data request made, it is possible to estimate the size of the data that will be returned for that object. Alternatively, the size in bits of data associated with each object can be maintained in object list 20, and retrieved by streaming function 26.

In a preferred example of the invention, object data is requested in stages, with each stage permitting the object to be rendered with greater detail. Accordingly, if the object's relative importance and number of frames that it has been visible are greater than other objects in the scene, it will have object data transmitted to the client so that it is capable of being rendered more accurately than other objects in the scene.

In this example, each object in the scene will have at least its bounding box representation transmitted to the client. Next, its base mesh is transmitted, then progressive meshes are successively transmitted to proceed from its crude representation to its most detailed refinement. Preferably, the progressive mesh technique used in this invention is that described in co-pending application Ser. No. 09/003,863, filed Jan. 7, 1998 and entitled "Method and Apparatus For Providing Continuous Level Of Detail," commonly owned by the assignee of the present application, the contents of which are incorporated herein by reference.

In step S34, streaming function 26 determines whether the estimated amount of bandwidth that will be consumed by the object's data will cause the total bandwidth consumed by all object data returned from the server to the client to exceed 90% of the available bandwidth for the next cycle. That is, the estimated amount of returned object data within any update cycle can not exceed the total bandwidth per update cycle, less the amount reserved for the Back Channel. If the estimated amount exceeds this threshold, processing ends. Otherwise processing advances to step S36, where the request for the object data is transmitted from the client to the server.

Streaming function 26 next determines whether all objects in priority queue 24 have been processed. If not, processing returns to step S28; otherwise processing ends.

It should be noted that streaming function 26 is only concerned with the identification of objects for which data requests should be made and how many requests can be made per update cycle. The actual mechanism used by the network to send requests and data can be implemented by any number of transmission techniques known to those skilled in the art. As such, a detailed discussion of such mechanisms is not presented here so as not to obscure the invention.

Thus, there has been shown and described hereinabove a novel method and apparatus for providing scene assessment and update prioritization that can accomplish low-latency streaming of 3-D virtual environments in accordance with all of the objects and advantages sought therefor. Many changes, alterations, modifications and other uses and applications of the subject method and apparatus will become apparent to those skilled in the art after considering the specification together with the accompanying drawings. All such changes, alterations and modifications which do not depart from the spirit and proper legal scope of the invention are deemed to be covered by the invention, as defined by the claims which follow.

I claim:

1. An apparatus in a computer graphics system adapted to provide at least a visual impression from the instantaneous perspective of a hypothetical viewer within a virtual environment, said environment comprising a plurality of objects each having a corresponding position within said environment and each comprising object data useful for rendering a representation of said object on a computer graphics display, said object data being stored in a storage device associated with a server, each of said objects also having a corresponding object primitive based on a geometry thereof, said server receiving requests for said object data and providing said object data in accordance with said requests via a data pipe, said computer graphics system providing the ability to change the instantaneous perspective of said hypothetical viewer, a viewpoint being associated with said instantaneous perspective of said hypothetical viewer, said viewpoint capturing a scene of said environment that includes certain of said objects, said apparatus comprising:

object assessment means for establishing a priority among said certain objects within said scene, said object assessment means determining said priority in accordance with an importance that is calculated for each of said certain objects based on said corresponding object primitive of each of said certain objects; and streaming means for requesting said object data of said certain objects from said server in accordance with said priority via said data pipe.

2. An apparatus according to claim 1, wherein said computer graphics system provides the ability to change the instantaneous perspective of said hypothetical viewer in accordance with a frame update rate, said apparatus further comprising:

amortization means for setting respective times during which said object assessment means and said streaming means are operative in accordance with said frame update rate.

3. An apparatus according to claim 1, further comprising:
a priority queue that lists said certain objects in accordance with said priority, the contents of said priority queue being filled by said object assessment means and read by said streaming means.

4. An apparatus according to claim 1, wherein said object primitive is a bounding box.

5. An apparatus according to claim 1, wherein said data pipe has a bandwidth, said streaming means communicating with said server via said data pipe using a front channel for receiving said object data from said server, and a back channel for sending said requests for said object data to said server, said streaming means reserving a first portion of said bandwidth for said front channel and a second portion of said bandwidth for said back channel.

6. An apparatus according to claim 5, wherein said second portion is based on a predetermined minimum percentage of said bandwidth and said first portion is based on an expected amount of object data to be returned by said server and said second portion.

7. An apparatus according to claim 5, wherein said streaming means insures that an expected amount of data to be returned by said server in accordance with said requests will not exceed said second portion of said bandwidth.

8. An apparatus according to claim 5, wherein said computer graphics system provides the ability to change the instantaneous perspective of said hypothetical viewer in accordance with a frame update rate, said first and second portions of said bandwidth being based on said frame update rate.

9. An apparatus according to claim 1, wherein said object assessment means calculates a turn rate associated with the changing instantaneous perspective of said hypothetical viewer, said importance of each of said certain objects being further based on said corresponding position of each of said certain objects relative to a visual center of said scene adjusted by said turn rate.

10. An apparatus according to claim 1, wherein said computer graphics system provides the ability to change the instantaneous perspective of said hypothetical viewer in accordance with a frame update rate, said object assessment means determining a number of frames ignored for each of said certain of said objects, said number of frames ignored indicating how many frame updates have been performed during which said corresponding object has remained in said scene without said streaming means requesting its object data from said server, said importance of each of said certain objects being further based on said corresponding number of frames ignored.

11. A computer graphics system adapted to provide at least a visual impression from the instantaneous perspective of a hypothetical viewer within a virtual environment, said environment comprising a plurality of objects each having a corresponding position within said environment and each comprising object data useful for rendering a representation of said object on a computer graphics display, each of said objects also having a corresponding object primitive based on a geometry thereof, said computer graphics system comprising:
a server having a storage device associated therewith, said object data being stored in said storage device, said server receiving requests for said object data and providing said object data in accordance with said requests via a data pipe;
means for changing the instantaneous perspective of said hypothetical viewer, a viewpoint being associated with said instantaneous perspective of said hypothetical viewer, said viewpoint capturing a scene of said environment that includes certain of said objects; and
a client that communicates with said server via said data pipe, said client including:
object assessment means for establishing a priority among said certain objects within said scene, said object assessment means determining said priority in accordance with an importance that is calculated for each of said certain objects based on said corresponding object primitive of each of said certain objects; and
streaming means for requesting said object data of said certain objects from said server in accordance with said priority.

12. A method in a computer graphics system adapted to provide at least a visual impression from the instantaneous perspective of a hypothetical viewer within a virtual environment, said environment comprising a plurality of objects each having a corresponding position within said environment and each comprising object data useful for rendering a representation of said object on a computer graphics display, said object data being stored in a storage device associated with a server, each of said objects also having a corresponding object primitive based on a geometry thereof, said object data being accessible from said server via a data pipe, said computer graphics system providing the ability to change the instantaneous perspective of said hypothetical viewer, a viewpoint being associated with said instantaneous perspective of said hypothetical viewer, said viewpoint capturing a scene of said environment that includes certain of said objects, said method comprising:
calculating an importance for each of said certain objects based on said corresponding object primitive of each of said certain objects;
establishing a priority among said certain objects within said scene based on said importance; and
requesting said object data of said certain objects from said server via said data pipe in accordance with said priority.

13. A method according to claim 12, wherein said object primitive is a bounding box.

14. A method according to claim 12, wherein said data pipe has a bandwidth, said object data being received from said server using a front channel of said data pipe, and requests for said object data being sent to said server using a back channel of said data pipe, said requesting step including:
reserving a first portion of said bandwidth for said front channel; and
reserving a second portion of said bandwidth for said back channel.

15. A method according to claim 14, wherein said requesting step further includes:
insuring that an expected amount of data to be returned by said server in accordance with said requests will not exceed said second portion of said bandwidth.

16. A method according to claim 14, wherein said computer graphics system provides the ability to change the instantaneous perspective of said hypothetical viewer in accordance with a frame update rate, said first and second portions of said bandwidth being based on said frame update rate.

17. A method according to claim 12, wherein said calculating step includes:

calculating a turn rate associated with the changing instantaneous perspective of said hypothetical viewer; and comparing said corresponding position of each of said certain objects relative to a visual center of said scene adjusted by said turn rate.

18. A method according to claim 12, wherein said computer graphics system provides the ability to change the instantaneous perspective of said hypothetical viewer in accordance with a frame update rate, said calculating step including:

determining a number of frames ignored for each of said certain of said objects, said number of frames ignored indicating how many frame updates have been performed during which said corresponding object has remained in said scene without its object data being requested from said server.

* * * * *